US009811255B2

United States Patent
Raffa et al.

(10) Patent No.: US 9,811,255 B2
(45) Date of Patent: Nov. 7, 2017

(54) DETECTION OF GESTURE DATA SEGMENTATION IN MOBILE DEVICES

(75) Inventors: Giuseppe Raffa, Portland, OR (US); David L. Graumann, Portland, OR (US); Lakshman Krishnamurthy, Portland, OR (US); Jameson H. Williams, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 67 days.

(21) Appl. No.: 13/996,476

(22) PCT Filed: Sep. 30, 2011

(86) PCT No.: PCT/US2011/054383
§ 371 (c)(1),
(2), (4) Date: Jun. 20, 2013

(87) PCT Pub. No.: WO2013/048469
PCT Pub. Date: Apr. 4, 2013

(65) Prior Publication Data
US 2013/0285969 A1 Oct. 31, 2013

(51) Int. Cl.
*G09G 1/00* (2006.01)
*G06F 3/0488* (2013.01)
(Continued)

(52) U.S. Cl.
CPC .......... *G06F 3/0488* (2013.01); *G06F 1/1694* (2013.01); *G06F 3/017* (2013.01);
(Continued)

(58) Field of Classification Search
CPC ...... G06F 3/017; G06F 3/04883; G06F 1/163; G06F 3/0416
See application file for complete search history.

(56) References Cited

U.S. PATENT DOCUMENTS

| 6,072,494 A | 6/2000 | Nguyen |
| 6,990,639 B2 | 1/2006 | Wilson |

(Continued)

FOREIGN PATENT DOCUMENTS

| EP | 2 336 842 | 6/2011 |
| KR | 10-0981200 B1 | 9/2010 |
| KR | 10-2011-0069476 | 6/2011 |

OTHER PUBLICATIONS

Office Action in U.S. Appl. No. 12/835,079 Mailed Apr. 5, 2013, 19 pages.
(Continued)

*Primary Examiner* — Michael Faragalla
(74) *Attorney, Agent, or Firm* — Blakely Sokoloff Taylor and Zafman LLP

(57) ABSTRACT

Detection of gesture data segmentation in mobile devices. An embodiment of a mobile device includes an edge, the edge including at least a first side, and a first touch sensor of one or more touch sensors, the first touch sensor being a side touch sensor to detect contact with the first side of the mobile device. The mobile device further includes one or more motion detection elements to generate motion data representing motion of the mobile device through space over a period of time, a buffer for the storage of the motion data, and a gesture recognition module to interpret the motion data stored in the buffer, wherein the mobile device begins the storage of the motion data in the buffer upon detection of a start of gesture data event, the start of gesture data event including contact with the first touch sensor.

20 Claims, 6 Drawing Sheets

(51) Int. Cl.
G06F 3/01 (2006.01)
G06F 3/0346 (2013.01)
G06F 1/16 (2006.01)
H04W 52/02 (2009.01)

(52) U.S. Cl.
CPC .... *G06F 3/0346* (2013.01); *G06F 2200/1637* (2013.01); *G06F 2203/0339* (2013.01); *H04M 2250/12* (2013.01); *H04M 2250/22* (2013.01); *H04W 52/0254* (2013.01); *Y02B 60/50* (2013.01)

(56) References Cited

U.S. PATENT DOCUMENTS

| | | |
|---|---|---|
| 2002/0190947 A1 | 12/2002 | Feinstein |
| 2004/0169674 A1 | 9/2004 | Linjama |
| 2004/0193413 A1 | 9/2004 | Wilson et al. |
| 2005/0210419 A1 | 9/2005 | Kela et al. |
| 2005/0278559 A1 | 12/2005 | Sutardja et al. |
| 2006/0197750 A1* | 9/2006 | Kerr ............... G06F 1/1626 345/173 |
| 2006/0256082 A1* | 11/2006 | Cho ............... G06F 1/1626 345/156 |
| 2008/0259042 A1 | 10/2008 | Thorn |
| 2009/0265671 A1 | 10/2009 | Sachs et al. |
| 2010/0060576 A1 | 3/2010 | Underkoffler et al. |
| 2010/0111358 A1 | 5/2010 | Chai et al. |
| 2010/0287470 A1* | 11/2010 | Homma ............. G06F 3/03547 715/702 |
| 2010/0315337 A1 | 12/2010 | Ferren et al. |
| 2010/0315356 A1 | 12/2010 | Ferren et al. |
| 2012/0016641 A1 | 1/2012 | Raffa et al. |

OTHER PUBLICATIONS

International Search Report and Written Opinion from PCT/US2011/054383, (Mar. 27, 2012).
International Search Report and Written Opinion of the International Searching Authority for International Application No. PCT/US2011/043319, (Feb. 9, 2012).
Bartlett, Joel F., "Rock 'n' Scroll is Here to Stay", IEEE Computer Graphics and Applications, vol. 20, No. 3, May/Jun. 2000, 9 pages.
Eickeler, Stefan, et al., "Hidden Markov Model Based Continuous Online Gesture Recognition", In Proceedings of the 14th International Conference on Pattern Recognition, vol. 2, ICPR IEEE Computer Society, Washington, DC, 1206 (Aug. 16-18, 1998).
Harrison, B. L., et al., "Squeeze Me, Hold Me, Tilt Me! An Exploration of Manipulative User Interfaces, CHI 98—Apr. 18-23, 1998, CHI 98 Los Angeles CA USA", (Apr. 1998), pp. 17-24.
Hudson, S. E., et al., "Whack Gestures: Inexact and Inattentive Interaction with Mobile Devices, TEI 2010, Jan. 25-27, 2010, Cambridge, Mssachusetts, USA", (Jan. 2010), pp. 109-112.
Junker, H., et al., "Gesture Spotting with Body-Worn Internal Sensors to Detect User Activities, Preprint submitted to Elsevier Nov. 14, 2007", (Nov. 2007), 30 pgs.
Karam, M., et al., "A Taxonomy of Gestures in Human Computer Interactions," ACM Transactions on Computer-Human Interactions, 45 pgs.
Kauppila, Mikko, et al., "Accelerometer Based Gestural Control of Browser Applications," International Workshop on Real Field Identification, http://www.ee.oulu.fi/research/isg/files/pdf/Kauppila_UCS_2007.pdf last accessed Jun. 13, 2013, pp. W4-2 to W4-17.
Kauppila, Mikko, et al., "Mobile Phone Controller Based on Accelerative Gesturing," last accessed Jun. 13, 2013 http://www.pervasive2008.org/Papers/Demo/d8.pdf, pp. 130-133.
Kela, J., et al., "Accelerometer-based gesture control for a design environment", Personal Ubiquitous Computing, vol. 10, No. 5, (Jul. 2006), pp. 285-299.
Lee, Hyeon-Kyu, et al., "An HMM-Based Threshold Model Approach for Gesture Recognition", IEE Transactions on Pattern Analysis and Machine Intelligence, vol. 21, No. 10, (Oct. 1999), pp. 961-973.
Lee, Christopher, et al., "Online, Interactive Learning of Gestures for Human/Robot Interfaces", Proceedings of the 1996 IEEE International Conference on Robotics and Automation, Apr. 1996, 6 Pages.
Lyons, Kent, et al., "GART: The Gesture and Activity Recognition Toolkit", 12th Annual International Conference on Human-Computer Interaction, Beijing, China (Jul. 2007), 10 pages.
Parsani, Rahul, et al., "A Single Accelerometer Based Wireless Embedded System for Predefined Dynamic Gesture Recognition," Department of Electrical, Electronics and Instrumentation Birla Institute of Technology and Science—Pilani, Goa Campus, Off NH 17B, (2009), pp. 195-201.
Signer, Beat, et al., "iGesture: A General Gesture Recognition Framework", Proceedings of ICDAR 2007, 9th International Conference on Document Analysis and Recognition, Curitiba, Brazil (Sep. 2007), 5 pages.
Wu, Jiahui, et al., "Gesture Recognition with a 3-D Accelerometer," UIC 2009, LNCS 5585, pp. 25-38, 2009., Springer-Verlag Berlin Heidelberg 2009, (2009), pp. 25-38.
Yoo, J. W., et al., "Intuitive Interface device for Wearable Computers", International Conference on Next Generation PC, Oct. 2005, 5 pages.
Zappi, Piero, Hidden Markov Models Implementation for Tangible Interfaces, INTETAIN 2009, pp. 258-263, 2009, ICST 2009.
Extended European Search Report dated Apr. 14, 2015, in European Patent Application No. 11873104.1, 9 pages.
First Office Action dated Mar. 9, 2015 (+ English translation), in Chinese Patent Application No. 201180034400.9, 20 pages.
Junker, Holger et al., "Gesture spotting with body-worn inertial sensors to detect user activities," ScienceDirect, Pattern Recognition 41 (2008), 2010-2024.

* cited by examiner

DETECTION OF GESTURE DATA SEGMENTATION IN MOBILE DEVICES

CROSS-REFERENCE TO RELATED APPLICATION

This application is a national phase of PCT/US2011/054383 filed Sep. 30, 2011, which application is incorporated herein by reference in its entirety.

TECHNICAL FIELD

Embodiments of the invention generally relate to the field of electronic devices and, more particularly, to a method and apparatus for detection of gesture data segmentation in mobile devices.

BACKGROUND

Mobile devices, including cellular phones, smart phones, mobile Internet devices (MIDs), handheld computers, personal digital assistants (PDAs), and other similar devices, may be utilized for a wide variety of applications for various purposes, the input of information may take different forms.

Among other control inputs, the motion of the mobile device itself in space over time may in some cases provide information regarding some intent or other information from a user. The detection of the motion may utilize elements such as accelerator and gyroscope elements to detect the motion of the mobile device.

However, detection of a particular motion may be difficult. In some cases, an input motion in certain circumstances may be similar to the simple movement of the mobile device as the user moves or shifts in position. In particular, determining the beginning and end of motions may be difficult to discern, particularly when different users may handle the mobile device in varying ways.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
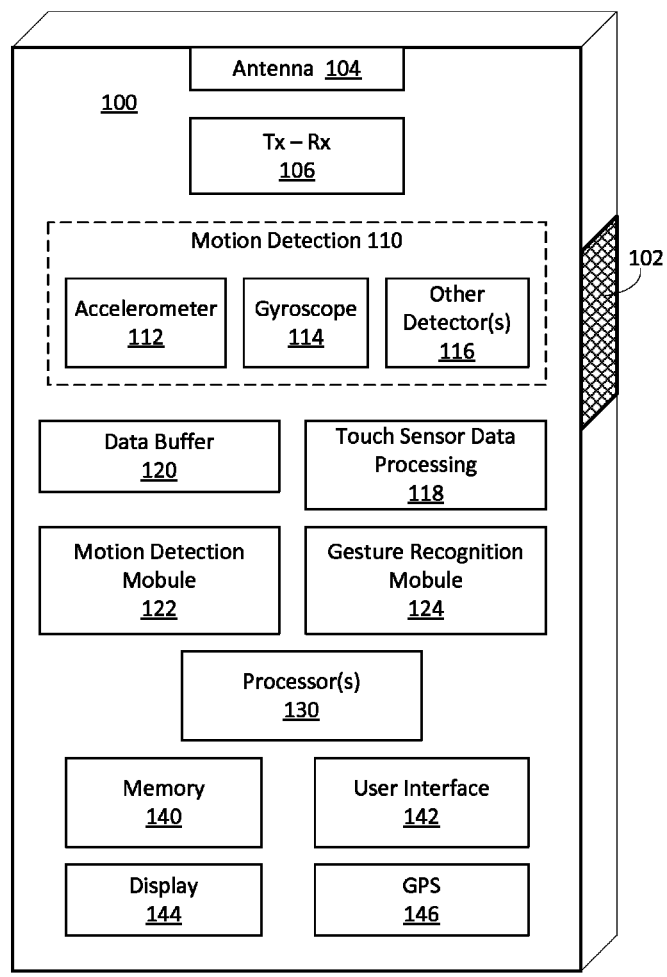
FIG. 1 is an illustration of an embodiment of a mobile device or system to provide for gesture data segmentation.

Embodiments of the invention are generally directed to detection of gesture data segmentation in mobile devices.

As used herein:

"Mobile device" means a mobile electronic device or system including a cellular phone, smart phone, mobile Internet device (MID), handheld computers, personal digital assistants (PDAs), and other similar devices.

"Touch sensor" means a sensor that is configured to provide input signals that are generated by the physical contact of a user, proximity of a user, or both (which may generally be referred to herein as "contact" with the touch sensor), including a sensor that detects contact by a thumb or other finger of a user of a device or system, including a mobile device. A touch sensor may include, but is not limited to, a capacitive sensor, which may detect the contact of a finger or hand on the capacitive sensor. A touch sensor may include a sensor used for multiple different purposes in the operation of a device or system.

"Side touch sensor" means a touch sensor that detects contact of a user, including a user's finger or hand, with at least one side of a device or system including a mobile device. A side touch sensor includes a touch sensor that is physically located at least in part on one side of the mobile device, or a side touch sensor that detects contact of a user with the side of the mobile device without being physically located on the side on the mobile device.

In some embodiments, a mobile device includes a touch sensor for the input of signals in connection with a gesture that involves moving the mobile device in space over time. In some embodiments, the mobile device utilizes the touch sensor in a manner that allows for determining the segmentation of gesture data, such as the determination of the beginning and the ending of gestures.

Gesture recognition based on inertial sensors embedded in mobile handheld devices, such as accelerometer and gyroscope elements, may provide a natural way to interact with a mobile device in an eyes-free fashion. In such gesture recognition, a user provides inputs through the motion of the mobile device through space over time, which may include motions in any direction.

However, there are challenges in enabling natural gesture interaction, and many technologies would result in unsatisfactory user experiences in device operation. In particular, there may be difficulty in detecting the segmentation of the stream of sensor data for detecting the gesture endpoints (i.e., the beginning and ending of a gesture that is performed intentionally by the user) in a manner that is natural for a user.

For example, a system that provides for continuous recognition of gestures will suffer from both excessive false positives (detection of motions that are not intended as gestures) and high power consumption. If motion detected by a motion detection element, such as an accelerometer, is used to detect the beginning of a gesture, there is a high likelihood of both false negatives when the beginning of a gesture is not detected (such as because the mobile device isn't moved abruptly enough or is moved in a different posture) and false positives when a motion that is not intended as a gesture is interpreted as a gesture. Using motion detection to commence gesture detection will also result in excessive false positives, especially when the user is moving and is not working in a stationary position. Explicit segmentation based on a user interface or other application elements requires input by the user that does not allow for eyes-free interaction. For example, a standard input to the mobile device, such as a choice of a menu item, used to establish a state for detecting a gesture will create a cumbersome and non-natural experience for the user of the mobile device. Further, if a system includes mechanical buttons, the use of such buttons would cause fatigue to the user if the user is required to hold down such buttons in connection with gesture recognition.

In some embodiments, a stream of sensor data for a mobile device may be segmented by leveraging a side touch sensor of the mobile device. In some embodiments, the stream of data may be composed of sensor data from one or more motion sensors (such as a gyroscope, an accelerometer, another motion sensor, or a combination of such sensors), as required by a particular gesture recognition algorithm or module. While gyroscopes and accelerometers are specific examples of motion detectors, embodiments are not limited to any particular motion detector, but may include any detectors or sensors that are capable of detecting a physical change caused by the motion of a device.

In some embodiments, when a thumb (or other finger) makes contact with the side touch sensor, such as a natural motion of resting a thumb on the touch sensor, the event is captured by the gesture recognition subsystem indicating a "start of gesture data" event. In some embodiments, when the thumb or other finger is detached from the capacitive panel (with proper thresholds in timing to avoid false negatives for accidental movements of thumb) or makes a second type of contact operation, the absence of signal or second type of signal indicates to the gesture recognition subsystem an "end of gesture data" event. In some embodiments, between these "start" and "end" events, generated sensor data is buffered. When the end of gesture data event is captured, a gesture recognition algorithm or module may be employed on the buffered data in order to determine which gesture has been performed by the user.

In some embodiments, a movement detection module or algorithm may be utilized within the segmented stream to verify the movement being performed may be interpreted as a gesture. The movement detection module or algorithm may be utilized to enhance precision in the endpoint detection within the segmented data if, for example, the user started the gesture some time after touching the capacitive side panel (such as after a predetermined amount of time), which may indicate that no gesture was intended.

In some embodiments, a side touch sensor may further be utilized to establish the ending of a gesture for a mobile device. In an example, the side touch sensor may be used to indicate the ending of a gesture by an ending of contact with the touch sensor, such as, after retaining contact with the side touch sensor during the gesture, by lifting a finger or thumb away from the side touch sensor. In some embodiments, the side touch sensor is used to provide gesture detection that is natural and does not interfere with the user performing a gesture, while giving the user control of the interface, and preventing accidental triggering of gestures.

In some embodiments, the side touch sensor is used only to start the gesture recognition module, such that continuous contact with the side panel is not necessary. In some embodiments, the side touch sensor may be used in a different manner to indicate the ending of a gesture, such as by a second contact on the side touch sensor, which may include a different type of predefined contact or gesture on the side touch sensor. In one example, an ending of gesture data event may include a swipe or flick across the side touch sensor, with or without retaining contact with the side touch sensor during the gesture, which may provide a nature conclusion for a gesture. In a second example, an ending of gesture data event may include a double touch on the side touch sensor. When the user provides the predefined gesture the gesture recognition module starts processing the motion detection sensors data. In some embodiments, the device may provide feedback to the user (such as a certain sound or vibration) to indicate that a gesture has been recognized. In some embodiments, upon indicating a start of a gesture, the user can perform a gesture "in the air" without further contacting the side touch sensor.

In some embodiments, a "movement detection" algorithm or modules, which may be a part of a gesture recognition algorithm or module, will detect the precise start and stop of the movement, starting the gesture recognition algorithm or module's operation on the motion detector sensor data upon detection of the end of gesture data event.

Movement detection algorithms or modules and gesture recognition algorithms or modules may be implemented in several ways. Algorithms may include, but are not limited to, algorithms described in "Efficient Gesture Processing", U.S. patent application Ser. No. 12/835,079, filed Jul. 13, 2010.

In some embodiments, because a side touch sensor may be used for several other user interface functions, such as controlling a cursor on a display screen, the gesture recognition may be utilized only for gestures with characteristics (such as maximum amplitude, maximum speed, or other characteristics) are above a certain threshold.

FIG. 1 is an illustration of an embodiment of a mobile device or system to provide for gesture data segmentation. In some embodiments, the mobile device 100 includes a side touch sensor 102 for input of commands by a user using certain gestures. In this illustration the side touch sensor 102 is shown as being physically located in the surface of a side of the mobile device 100, but embodiments are not limited to this physical infrastructure. In some embodiments, the mobile device 100 may include one or more other touch sensors. In some embodiments, the mobile device 100 includes touch sensor data processing block or element 118 to process signals from the side touch sensor 102 and any other touch sensors, and to provide touch sensor data for interpretation and processing by the mobile device 100. In some embodiments, the touch sensor 102 may include capacitive sensors and may also include other sensors, such as an optical sensor. See, for example, U.S. patent application Ser. No. 12/650,582, filed Dec. 31, 2009 ("Optical Capacitive Thumb Control with Pressure Sensor"); U.S. patent application Ser. No. 12/646,220, filed Dec. 23, 2009 ("Contoured Thumb Touch Sensor Apparatus").

In some embodiments, the mobile device further includes one or more motion detection elements 110. In some embodiments, the motion detection elements 110 of the mobile device 100 may include, but are not limited to, one or more of an accelerometer 112 or similar element to detect acceleration of a mobile device, a gyroscope 114 or similar element to detect rotation of a mobile device, or one or more other motion sensors 116. While elements such as an accelerometer, a gyroscope, and other motion detectors are discussed and illustrated as separate elements, such elements may be combined into a single element. Further, a mobile device may include other elements that provide similar functions as accelerometers and gyroscopes in the detection of motion of the mobile device, and may include other types of motion detectors. For the purposes of this discussion, detection of motion of a mobile device includes the detection of motion and lack of motion of the mobile device. Motion of the mobile device includes movement of the mobile device in any direction from a prior position, including the rotation of the mobile device in relation to any axis point.

In some embodiments, data acquired by the mobile device 100 may be stored in a data buffer 120 for processing. In some embodiments, the data contained in the buffer 120 may include data that is collected by the motion detection elements 110 between a start gesture collection event and an end gesture event, where such event may include one or more gestures performed using the touch sensor 102. In some embodiments, the mobile device may include a motion detection module 122 to determine whether data collected in the buffer is indicative of a motion for a gesture. In some embodiments, the mobile device 100 may include a gesture recognition module 124 for the interpretation of motion data collected in the buffer 120, where operation of the gesture recognition module 124 may be triggered by the motion detection module 124.

The mobile device 100 may further include, for example, one or more transmitters and receivers 106 for the wireless transmission and reception of data, as well as one or more antennas 104 for such data transmission and reception; one or more processors 130 for the processing of data, which may include processing operation for data collected by the motion detection element or elements 110; a memory 140 for the storage of data; a user interface 142, including a graphical user interface (GUI), for communications between the mobile device 100 and a user of the device; a display circuit or controller 144 for providing a visual display to a user of the mobile device 100; and a location circuit or element, including a (GPS) circuit or element 146.

While the mobile device 100 is illustrated as containing all of the elements in a single unit, embodiments are not limited to this structure. In some embodiments, a mobile device may include more than one unit. In some embodiments, certain data is, for example, transmitted to a main unit from a separate accessory unit that may be interconnected to the main unit by a wireless connection. For example, a mobile device includes a smart phone or other similar unit together with a wireless accessory that may be interconnected with the smart phone by a Bluetooth or other wireless connection. In a particular example, the wireless accessory may include the motion detection elements 110 in a separate wireless accessory unit, where the motion of the separate unit generates the motion data for user gestures. In some embodiments, the wireless accessory unit (which may, for example, be in the form of a ring or other element worn by the user) includes the side touch sensor 102. In some embodiments, a user of the mobile device 100 may perform gestures utilizing the side touch sensor of the accessory unit to indicate the start of a gesture data event through contact with the side touch sensor.

Figure 2:
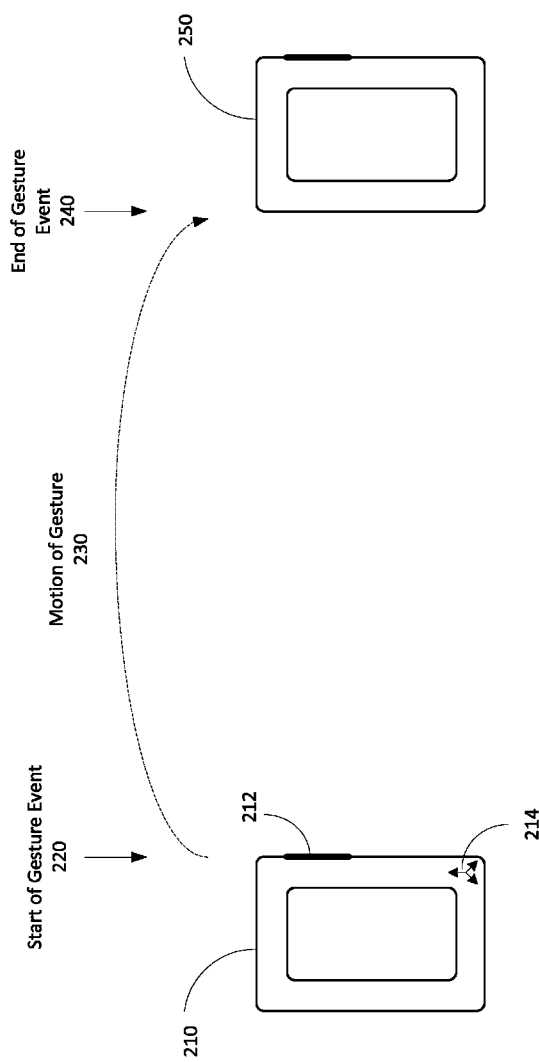
FIG. 2 is an illustration of an embodiment of gesture data collection.

FIG. 2 is an illustration of an embodiment of gesture data collection. In some embodiments, a mobile device 210 may be at a first position at a first point in time, where the mobile device 210 may or may not have been in motion before this point in time. In some embodiments, the mobile device includes a side touch sensor 212 and one or more motion detection elements 214, where the motion detection elements may include one or more of the accelerometer 112 or similar element to detect acceleration of the mobile device, the gyroscope 114 or similar element to detect rotation of the mobile device, and other motion detectors 116, as illustrated in FIG. 1.

In some embodiments, upon the detection of a start of gesture data event 220, which may include contract with the side touch sensor 212, the mobile device enters a state for collection of data describing motion of a gesture 230 of the mobile device in space over time as collected by the motion detection elements 214. In some embodiments, the collection of the data continues until the detection of an end of gesture data event 240 when the mobile device 250 is at an end point for the gesture.

Figure 3:
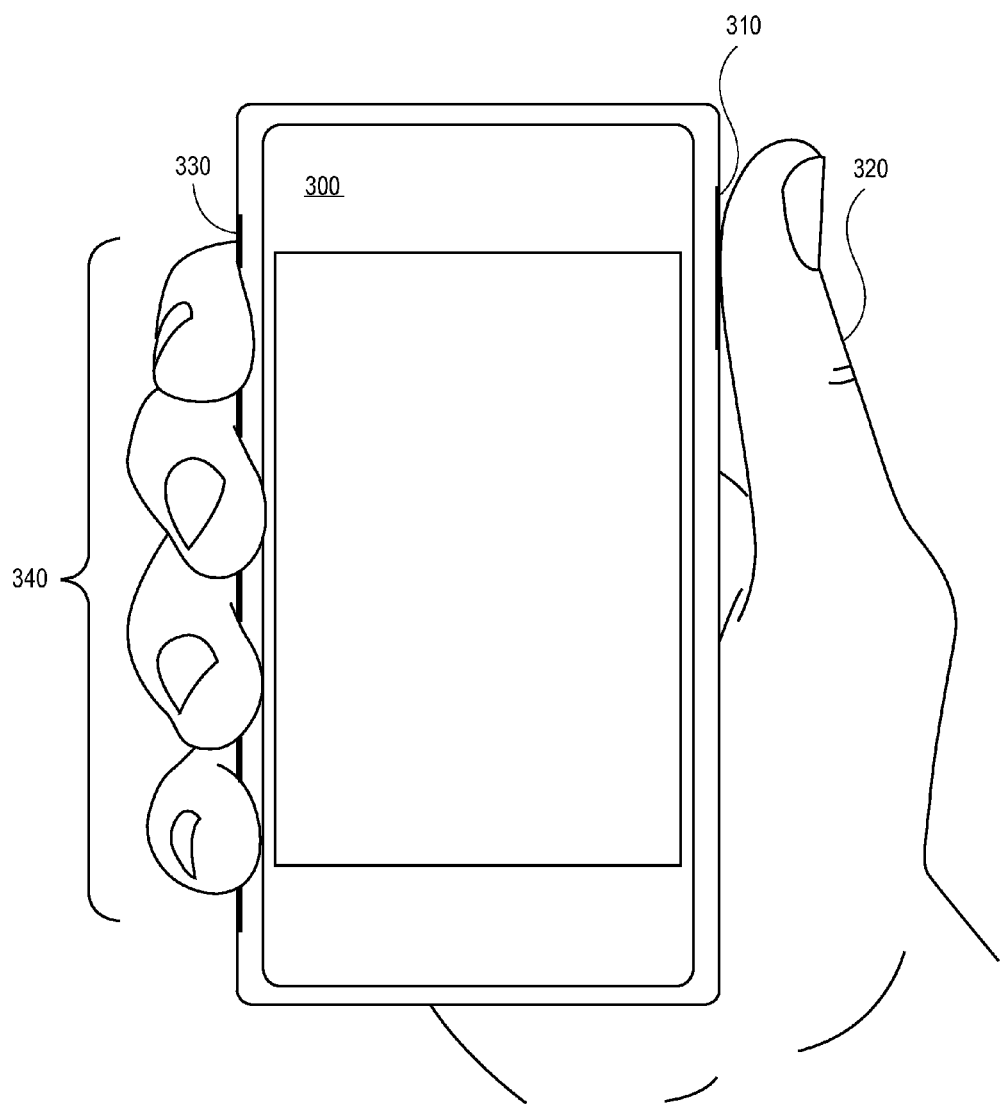
FIG. 3 is an illustration of an embodiment of a mobile device or system for the detection of a gesture.

FIG. 3 is an illustration of an embodiment of a mobile device or system for the detection of a gesture. In some embodiments, a mobile device 300 includes one or more side touch sensors. In this illustration, a first side touch sensor 310 may be accessible to a thumb 320 or other finger of a user who is grasping the mobile device 300. While this illustration shows the first side touch sensor 310 as a sensor of limited length, such as a touch sensor that may only be accessible to the thumb 320 of a user, embodiments are not limited to this illustration, and may include a sensor of greater length, including a touch sensor that runs the length of a side of the mobile device 300.

In some embodiments, the mobile device 300 operates to detect a start of gesture data event, which may include an event involving the contact of the thumb 320 or other finger of the user with the first side touch sensor 310. In some embodiments, the mobile device 300 operates to further detect an end of gesture data event, which may include the lifting of the thumb 320 or other finger of the user away from the first side touch sensor 310, or may include another input using the side touch sensor, such as a flick across the first side touch sensor 310 or a double touch of the first side touch sensor 310.

In some embodiments, the mobile device 300 may include additional side touch sensors, such as a second side touch sensor 330 for an opposite side of the mobile device 300. While FIG. 3 illustrates a particular implementation in which the first side touch sensor 310 is relatively short in physical length and the second side touch sensor 330 is relatively long, embodiments are not limited to any particular size of the touch sensors. In some embodiments, a start of gesture data event may include detection of the grasping of the mobile device 300 by the hand of a user, which may include detection of the wrapping of one or more of the other fingers 340 of the user around the mobile device 300. In some embodiments, the second side touch sensor 330 further allows for a reverse (or mirrored) operation by a user in either the left hand or the right hand of the user, whereby a user may, for example, indicate a start of gesture data event through the grasping of the mobile device 300 by either the left hand or the right hand of the user. In some embodiments, the mobile device 300 includes capability to adapt a gesture recognition module, such as gesture recognition module 122 illustrated in FIG. 1, to normalize data to be collected for either a left-handed user or a right handed user such the operation of the mobile device 300 is the same regardless of which hand a user chooses to use in handling the mobile device 300. In some embodiments, the indication of a start of a gesture data event with the right hand of the user operates to indicate that the gesture will be performed with the right hand of the user, and the indication of a start of a gesture data event with the left hand of the user operates to indicate that the gesture will be performed with the left hand of the user.

Figure 4:
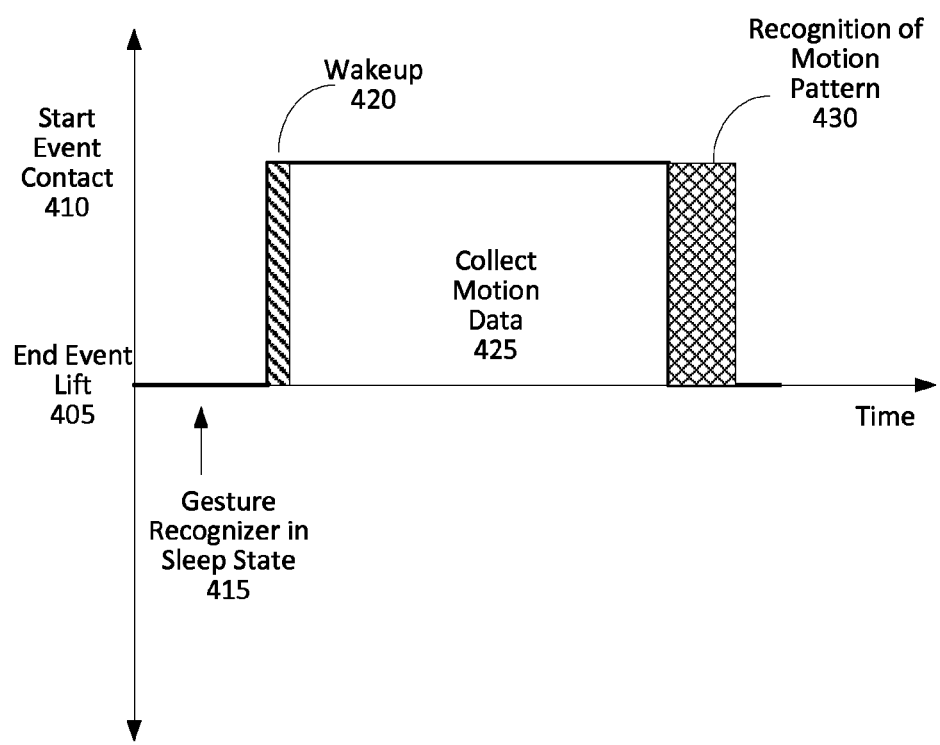
FIG. 4 provides a graph to illustrate an embodiment of gesture data collection and interpretation.

FIG. 4 provides a graph to illustrate an embodiment of gesture data collection and interpretation. In this illustration, shown over a period of time, a gesture recognizer (such as the gesture recognition module 124 illustrated in FIG. 1) of a mobile device may initially be in a sleep state 415. In some embodiments, upon the detection by the mobile device of a start of gesture data event such as contact on one or more side touch sensors 410, the gesture recognizer may be woken up 420. In some embodiments, the mobile device may collect motion data 425 after the start of gesture data event 410.

In some embodiments, upon the detection of an end of gesture data event such as a lifting away from a side touch sensor of the one or more side touch sensors (or other such event) 405, the collection of motion data by the mobile device 425 may cease. In some embodiments, the mobile device may operate to recognize a motion pattern of the collected motion data 430, which may result in the identification of an intended gesture and the implementation of a command based on the identified gesture.

Figure 5:
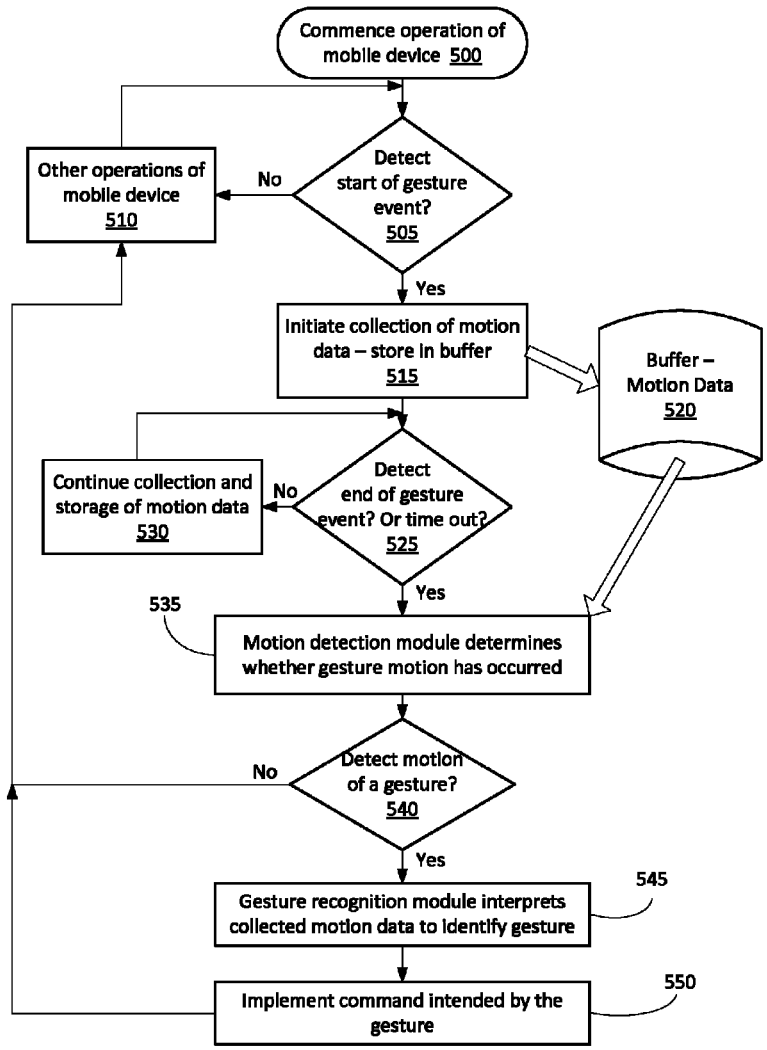
FIG. 5 is an illustration of an embodiment of a process for collection and interpretation of gesture data.

FIG. 5 is an illustration of an embodiment of a process for collection and interpretation of gesture data. In some embodiments, after commencement of operation of a mobile device 500, the mobile device may be placed in condition to detect a start of gesture data event 505, which may include events described above regarding contact with one or more side touch sensors. If no start of gesture data event is detected, the mobile device continues with other operations 510. This may includes circumstances in which the mobile device is in motion in a manner that would be detected by one or more motion detector elements because these movements are not intended to be interpreted as a gesture.

In some embodiments, if a start of gesture data event is detected, the mobile device initiates the collection of motion data generated by the one or more motion detection elements of the mobile device 515, with the collected motion data being stored in a buffer 520 for access after the end of the gesture.

In some embodiments, the mobile device may operate to detect an end of gesture data event 525, where an end of gesture data event includes the end of gesture data events described above with regard to one or more a side touch sensors. If an end of gesture of event is not detected, the mobile device continues to collect and store motion data 530. In some embodiments, the collection of motion data may also cease after a certain time period of motion or a certain period of no motion (a time out condition) 525 because the extended time periods may be interpreted as not being intended as a gesture. The existence and length of a time out period depends on the particular operation of the mobile device and the types of gestures being detected.

In some embodiments, upon detection an end of gesture data event (or time out), there is a determination by a motion detection module or algorithm whether a gesture motion has occurred 535 based at least in part on the collected motion data stored in the buffer 520. If the motion of a gesture is not detected, the mobile device continues with other operations 510. If the motion of a gesture is detected, a gesture recognition module interprets the collected motion data 545 from the buffer 520 to identify the gesture. In some embodiments, the mobile device may then implement a command intended by the gesture 550 and return to other operations 510.

Figure 6:
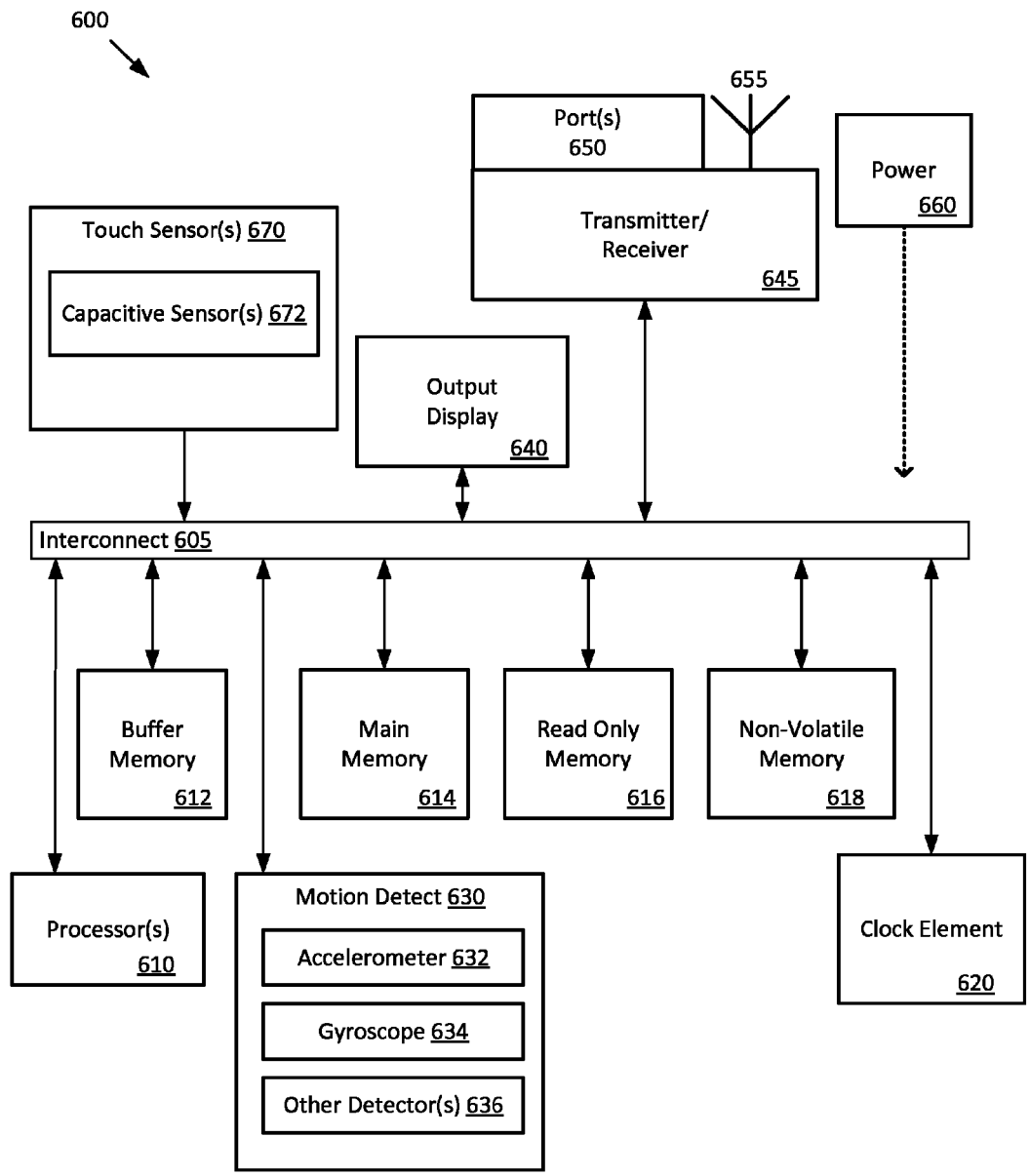
FIG. 6 illustrates an embodiment of a mobile device or system to provide for gesture data segmentation.

FIG. 6 illustrates an embodiment of a mobile device or system to provide for gesture data segmentation. In this illustration, certain standard and well-known components that are not germane to the present description are not shown. Under some embodiments, the mobile device 600 comprises an interconnect or crossbar 605 or other communication means for transmission of data. The device 600 may include a processing means such as one or more processors 610 coupled with the interconnect 605 for processing information. The processors 610 may comprise one or more physical processors and one or more logical processors. The interconnect 605 is illustrated as a single interconnect for simplicity, but may represent multiple different interconnects or buses and the component connections to such interconnects may vary. The interconnect 605 shown in FIG. 6 is an abstraction that represents any one or more separate physical buses, point-to-point connections, or both connected by appropriate bridges, adapters, or controllers.

In some embodiments, the device 600 includes a buffer memory 612, which may be utilized for the storage of motion data. In some embodiments, the buffer memory 612 may be buffer connected to or a part of a processor 610. In some embodiments, the device 600 further includes one or more motion detection elements 630, which may include one or more of an accelerometer element 632, a gyroscope element 634, and one or more other motion detector elements 636. In some embodiments, the mobile device commences storage of motion data from the motion detection elements 630 into the buffer 612 upon detection of a start of gesture data event and ceases storage of such motion data upon the detection of an end of gesture data event. In some embodiments, the device 600 includes one or more touch sensors 670. In some embodiments, the touch sensors 670 may includes capacitive sensors 672, and may include one or more other sensors, such as optical sensors. In some embodiments, a start of gesture data event or an end of gesture data event may include a gesture detected by contact with the one or more touch sensors, as described above.

In some embodiments, the device 600 further comprises a random access memory (RAM) or other dynamic storage device or element as a main memory 614 for storing information and instructions to be executed by the processors 610. RAM memory includes dynamic random access memory (DRAM), which requires refreshing of memory contents, and static random access memory (SRAM), which does not require refreshing contents, but at increased cost. DRAM memory may include synchronous dynamic random access memory (SDRAM), which includes a clock signal to control signals, and extended data-out dynamic random access memory (EDO DRAM). In some embodiments, memory of the system may include certain registers or other special purpose memory. The device 600 also may comprise a read only memory (ROM) 616 or other static storage device for storing static information and instructions for the processors 610. The device 600 may include one or more non-volatile memory elements 618 for the storage of certain elements. In some embodiments, the device may include a clock element or other time measurement element 620, where the clock element 620 may include the measurement of time in connection with the receipt and interpretation of motion data.

The device 600 may also be coupled via the interconnect 605 to an output display 640. In some embodiments, the display 640 may include a liquid crystal display (LCD) or any other display technology, for displaying information or content to a user. In some environments, the display 640 may include a touch-screen that is also utilized as at least a part of an input device. In some environments, the display 640 may be or may include an audio device, such as a speaker for providing audio information.

One or more transmitters or receivers 645 may also be coupled to the interconnect 605. In some embodiments, the device 600 may include one or more ports 650 for the reception or transmission of data. The device 600 may further include one or more antennas 655 for the reception of data via radio signals.

The device 600 may also comprise a power device or system 660, which may comprise a power supply, a battery, a solar cell, a fuel cell, or other system or device for providing or generating power. The power provided by the power device or system 660 may be distributed as required to elements of the device 600.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs which are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, floppy diskettes, optical disks, compact disk read-only memory (CD-ROM), and magneto-optical disks, read-only memory (ROM), random access memory (RAM), erasable programmable read-only memory (EPROM), electrically-erasable programmable read-only memory (EEPROM), magnet or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the embodiments of the present invention is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example of the present invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the present invention, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. A mobile device comprising:
   an edge, the edge including at least a first side and a second side, the second side being opposite the first side;
   a first touch sensor of a plurality of touch sensors, the first touch sensor being a side touch sensor to detect contact with the first side of the mobile device;
   a second touch sensor of the plurality of touch sensors, the second touch sensor being a side touch sensor to detect contact with the second side of the mobile device;
   one or more motion detection elements to generate motion data representing motion of the mobile device through space over a period of time;
   a buffer for the storage of the motion data; and
   a gesture recognition module to interpret the motion data stored in the buffer;
   wherein the mobile device is to begin the storage of the motion data for a first gesture in the buffer upon detection of a start of gesture data event at a first time, the mobile device being in a first position in space at the first time, the start of gesture data event including contact with at least the first touch sensor and the second touch sensor to indicate a grasp of the mobile device with either the right hand or the left hand of a user, and the mobile device is to halt at a second time the storage of motion data for the first gesture upon the detection of an end of gesture data event, the mobile device being in a second position in space at the second time, the end of gesture event including a release of contact with at least one of the first touch sensor or the second touch sensor;
   wherein motion of the mobile device includes movement of the mobile device in any direction through space from the first position to the second position;
   wherein interpretation of the motion data includes the gesture recognition module to normalize the motion data for the first gesture as motion data for a gesture performed by moving the mobile device through space from the first position to the second position with the mobile device being grasped with either the left hand or the right hand of the user depending on whether the left hand or right hand is detected grasping the mobile device in the start of gesture data event.

2. The mobile device of claim 1, wherein the start of gesture data event at the first time includes a contact of a thumb or other finger of the user with either the first touch sensor or the second touch sensor and a contact of one or more other fingers of the user with the other of the first touch sensor or the second touch sensor.

3. The mobile device of claim 1, wherein the second side is an opposite side to the first side.

4. The mobile device of claim 1, wherein the end of gesture data event at the second time further includes a gesture performed by a user on or across either the first touch sensor or the second touch sensor.

5. The mobile device of claim 1, further comprising a clock element to determine the passage of time, wherein the mobile device utilizes a passage of time determined by the clock element to establish a time out condition to end collection of motion data.

6. The mobile device of claim 1, further comprising a motion detection module, wherein, in response to the detection of the end of gesture event at the second time, the motion detection module is to determine whether the motion data in the buffer is indicative of a motion through space for a gesture, and, if so, to trigger operation of the gesture recognition module.

7. The mobile device of claim 1, wherein the one or more motion detection elements includes one or more of an accelerometer element and a gyroscope element.

8. A method comprising:
detecting a start of gesture data event at a first time for a mobile device, the mobile device being in a first position in space at the first time, the mobile device including at least a first touch sensor and a second touch sensor, the start of gesture data event including contact with at least the first touch sensor and the second touch sensor to indicate a grasp of the mobile device with either the right hand or the left hand of a user;
collecting motion data generated by one or more motion detection elements of the mobile device for a first gesture, the motion data representing motion of the mobile device through space over a period of time;
storing the collected motion data for the first gesture in a buffer;
detecting an end of gesture data event at a second time, the mobile device being in a second position in space at the second time, motion of the mobile device including movement of the mobile device in any direction through space from the first position to the second position, the end of gesture event including a release of contact with at least one of the first touch sensor or the second touch sensor, and halting the collection of motion data; and
interpreting the motion data stored in the buffer using a gesture detection module, wherein interpreting the motion data includes normalizing the motion data for the first gesture as motion data for a gesture performed by moving the mobile device through space from the first position to the second position with the mobile device being grasped with either the left hand or the right hand of the user depending on whether the left hand or right hand is detected grasping the mobile device in the start of gesture data event.

9. The method of claim 8, wherein the start of gesture data event at the first time includes a contact of a thumb or other finger of the user with either the first touch sensor or the second touch sensor and a contact of one or more other fingers of the user with the other of the first touch sensor or the second touch sensor.

10. The method of claim 8, wherein the end of gesture data event at the second time further includes a gesture performed by a user on or across either the first touch sensor or the second touch sensor.

11. The method of claim 8, further comprising measuring a passage of time and establishing a time out condition to end collection of motion data if the passage of time is greater than a predetermined length of time.

12. The method of claim 8, further comprising:
in response to detection of the end of gesture event, evaluating the motion data and determining by a motion detection module whether the motion data in the buffer is indicative of a motion for a gesture using a motion detection algorithm, and, if so, triggering the gesture recognition module to commence the interpretation of the motion data.

13. A system comprising:
a plurality of touch sensors including a first touch sensor and a second touch sensor to detect contact of a user with the touch sensors;
an accelerometer to detect acceleration of the system and a gyroscope to detect rotation of the system, the accelerometer and gyroscope to generate motion data representing motion of the system through space over a period of time;
a buffer for storage of the motion data generated by the accelerometer and gyroscope;
a motion detection module to evaluate the motion data stored in the buffer; and
a gesture recognition module to interpret the motion data stored in the buffer;
wherein the system is to begin the storage of the motion data for a first gesture in the buffer upon detection of a start of gesture data event at a first time, the system being in a first position in space at the first time, the start of gesture data event including contact of the user with at least the first touch sensor and the second touch sensor to indicate a grasp of the system with either the right hand or the left hand of a user, and the system is to halt the storage of motion data for the first gesture upon the detection of an end of gesture data event at a second time, the end of gesture event including a release of contact with at least one of the first touch sensor or the second touch sensor;
wherein motion of the system includes movement of the system in any direction through space from the first position to the second position;
wherein interpretation of the motion data includes the gesture recognition module to normalize the motion data for the first gesture as motion data for a gesture performed by moving the system through space from the first position to the second position with the system being grasped with either the left hand or the right hand of the user depending on whether the left hand or right hand is detected grasping the system in the start of gesture data event.

14. The system of claim 13, wherein the start of gesture data event at the first time includes a contact of a thumb or other finger of user with either the first touch sensor or the second touch sensor and a contact of one or more other fingers of the user with the other of the first touch sensor or the second touch sensor.

15. The system of claim 13, wherein the end of gesture data event at the second time further includes a gesture performed by a user on or across either the first touch sensor or the second touch sensor.

16. The system of claim 13, further comprising a motion detection module, wherein, in response to the detection of the end of gesture event at the second time, the motion detection module is to determine whether the motion data in the buffer is indicative of a motion for a gesture, and, if so, to trigger operation of the gesture recognition module.

17. A non-transitory computer-readable medium having stored thereon data representing sequences of instructions that, when executed by a processor, cause the processor to perform operations comprising:

detecting a start of gesture data event at a first time for a mobile device, the mobile device being in a first position in space at the first time, the mobile device including at least a first touch sensor and a second touch sensor, the start of gesture data event including contact with at least the first touch sensor and the second touch sensor to indicate a grasp of the mobile device with either the right hand or the left hand of a user;

collecting motion data generated by one or more motion detection elements of the mobile device for a first gesture, the motion data representing motion of the mobile device through space over a period of time;

storing the collected motion data for the first gesture in a buffer;

detecting an end of gesture data event at a second time, the mobile device being in a second position in space at the second time, motion of the mobile device including movement of the mobile device in any direction through space from the first position to the second position, the end of gesture event including a release of contact with at least one of the first touch sensor or the second touch sensor, and halting the collection of motion data; and interpreting the motion data stored in the buffer using a gesture detection module, wherein interpreting the motion data includes normalizing the motion data for the first gesture as motion data for a gesture performed by moving the mobile device through space from the first position to the second position with the mobile device being grasped with either the left hand or the right hand of the user depending on whether the left hand or right hand is detected grasping the mobile device in the start of gesture data event.

18. The medium of claim 8, further including instructions for:

in response to detection of the end of gesture event at the second time, evaluating the motion data and determining by a motion detection module whether the motion data in the buffer is indicative of a motion for a gesture using a motion detection algorithm, and, if so, triggering the gesture recognition module to commence the interpretation of the motion data.

19. The mobile device of claim 1, wherein motion of the mobile device includes rotation of the mobile device in relation to any axis point.

20. The mobile device of claim 1, wherein the mobile device is currently in motion at the first time.

\* \* \* \* \*